(12) United States Patent
Lu et al.

(10) Patent No.: US 9,454,257 B2
(45) Date of Patent: Sep. 27, 2016

(54) ELECTRONIC SYSTEM

(71) Applicant: PIXART IMAGING INC., Hsin-Chu (TW)

(72) Inventors: Chun Yi Lu, Hsinchu (TW); Tzung Min Su, Hsinchu (TW); Yuan Yu Peng, Hsinchu (TW); Yi Hsien Ko, Hsinchu (TW)

(73) Assignee: PIXART IMAGING INC., Hsinchu (TW)

( * ) Notice: Subject to any disclaimer, the term of this patent is extended or adjusted under 35 U.S.C. 154(b) by 141 days.

(21) Appl. No.: 13/782,681

(22) Filed: Mar. 1, 2013

(65) Prior Publication Data
US 2013/0271369 A1    Oct. 17, 2013

(30) Foreign Application Priority Data

Apr. 17, 2012  (TW) ............... 101113551 A

(51) Int. Cl.
*G06F 3/041*  (2006.01)
*G06F 3/02*   (2006.01)
*G06F 3/042*  (2006.01)
*G06F 3/0488* (2013.01)

(52) U.S. Cl.
CPC ........... *G06F 3/0416* (2013.01); *G06F 3/0227* (2013.01); *G06F 3/042* (2013.01); *G06F 3/04883* (2013.01); *G06F 3/04886* (2013.01); *G06F 2203/04803* (2013.01); *G06F 2203/04808* (2013.01)

(58) Field of Classification Search
CPC .... G06F 3/0416; G06F 3/0227; G06F 3/042; G06F 3/0421; G06F 3/0428; G06F 3/04886; G06F 2203/04808; G06F 2203/04803; G06F 3/04883; G06F 3/03547

USPC ..................... 345/156–175; 178/18.01–18.09
See application file for complete search history.

(56) References Cited

U.S. PATENT DOCUMENTS

| 4,782,328 A | 11/1988 | Denlinger |
| 7,689,381 B2 | 3/2010 | Lin et al. |
| 8,754,854 B1 * | 6/2014 | Hamburgen .......... G06F 3/0489 345/168 |
| 2002/0145595 A1 * | 10/2002 | Satoh ........................... 345/173 |

(Continued)

FOREIGN PATENT DOCUMENTS

| CN | 101561711 A | 10/2009 |
| CN | 101794181 A | 8/2010 |

(Continued)

OTHER PUBLICATIONS

U.S. Appl. No. 13/606,942, filed Sep. 7, 2012, Pixart Imaging Inc.

(Continued)

*Primary Examiner* — Alexander Eisen
*Assistant Examiner* — Abhishek Sarma
(74) *Attorney, Agent, or Firm* — Juan Carlos A Marquez; Marquez IP Law Office

(57) ABSTRACT

An electronic system includes a device having a screen and an optical touch device. The optical touch device monitors the activity of an object on the screen of the device. When the object performs an operation in a first region of the screen, the optical touch device generates first data; and when the object performs an operation outside the first region, the optical touch device generates second data, wherein the first data and the second data are of different data types.

16 Claims, 15 Drawing Sheets

(56) References Cited

U.S. PATENT DOCUMENTS

| | | | |
|---|---|---|---|
| 2003/0174125 A1* | 9/2003 | Torunoglu et al. | 345/168 |
| 2007/0262964 A1 | 11/2007 | Zotov et al. | |
| 2010/0110025 A1* | 5/2010 | Lim | 345/173 |
| 2010/0188353 A1 | 7/2010 | Yoon et al. | |
| 2010/0238138 A1* | 9/2010 | Goertz et al. | 345/175 |
| 2010/0259482 A1* | 10/2010 | Ball | 345/168 |
| 2011/0047459 A1* | 2/2011 | Van Der Westhuizen | 715/702 |
| 2012/0044164 A1 | 2/2012 | Kim et al. | |
| 2012/0113061 A1 | 5/2012 | Ikeda | |
| 2012/0127129 A1 | 5/2012 | Su et al. | |
| 2012/0256839 A1* | 10/2012 | Suggs | 345/168 |

FOREIGN PATENT DOCUMENTS

| | | |
|---|---|---|
| CN | 101833401 A | 9/2010 |
| CN | 101882029 A | 11/2010 |
| TW | 200809591 | 4/2007 |
| TW | 201108064 A1 | 6/2010 |
| TW | 201033859 A1 | 9/2010 |

OTHER PUBLICATIONS

Office Action from Republic of China Intellectual Property Office in the corresponding Taiwan application 10113551 dated Jun. 25, 2014, 5 pp., with partial English translation Partial.

\* cited by examiner

ELECTRONIC SYSTEM

CROSS-REFERENCE TO RELATED APPLICATION

The present application is based on, and claims priority from, Taiwan Patent Application Serial Number 101113551, filed on Apr. 17, 2012, the disclosure of which is hereby incorporated by reference herein in its entirety.

BACKGROUND

1. Technical Field

The present invention relates to an electronic system, and particularly related to, an electronic computing system.

2. Related Art

Notebooks are a common type of small electronic computing system. A notebook usually has a screen and a keyboard. In addition to using the keyboard for inputting characters, users can attach a computer mouse to the notebook to control the motion of a cursor on the screen and to select a graphical item by clicking a button of the computer mouse. The computer mouse is normally placed beside the notebook, and when users input characters and manipulate a computer mouse, their hands have to move between the keyboard and the computer mouse.

Some notebooks have touch pads and track points. The touch pads and track points can replace computer mice so that when users operate the notebooks, users no longer need computer mice. However, notebooks with the touch pads and the track points installed include additional mechanisms and circuits.

Tablet computers are another type of small computer system. A tablet computer has a touch screen, by which users can operate the tablet computer. Generally, users use their fingers or a stylus to touch the screen to select a target. The touch control system computes the coordinates of the touch point, and sends the coordinates to the operating system of the tablet computer. The operating system will determine the desired target by the coordinates and execute the function representing the target.

SUMMARY

One embodiment of the present invention provides an electronic system, which comprises a device comprising a screen and an optical touch device. The optical touch device is configured to detect activity of an object on the screen. The optical touch device is also configured to generate first data when the object performs an operation on a first region of the screen and to generate second data when the object performs an operation outside the first region, wherein the first data and the second data is of different data types.

Another embodiment of the present invention discloses an electronic system, which comprises a device comprising a keyboard and an optical touch device. The optical touch device is configured to detect activity of an object on the keyboard, configured to generate a first gesture event.

Another embodiment of the present invention discloses an electronic system, which comprises a platform comprising a key assembly and an optical touch device. The optical touch device is configured to detect activity of an object on the key assembly to determine a key pressed by the object and to generate a corresponding key code.

To provide a better understanding of the above-described objectives, characteristics and advantages of the present invention, a detailed explanation is provided in the following embodiments with reference to the drawings.

BRIEF DESCRIPTION OF THE DRAWINGS

The invention will be described according to the appended drawings in which.

DETAILED DESCRIPTION OF DISCLOSED EMBODIMENTS

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

Optical touch devices disclosed in some embodiments can output data other than touch point coordinates.

Optical touch devices disclosed in some embodiments can have the functions of multiple input devices.

Optical touch devices disclosed in some embodiments can provide the functions of multiple input devices.

Optical touch devices disclosed in some embodiments allow users to flexibly configure or set up desired input functions thereon.

Figure 1:
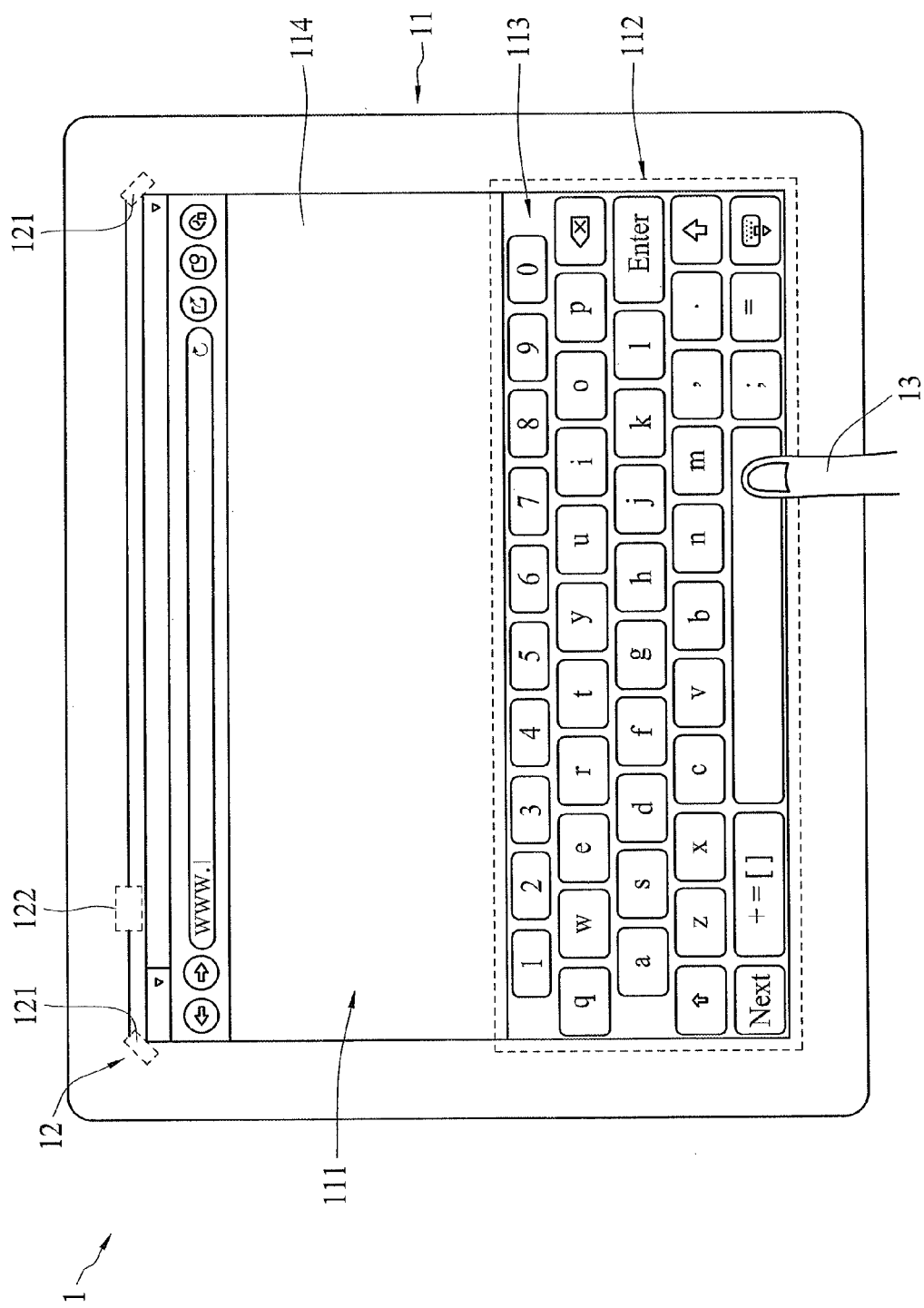
FIG. 1 schematically depicts an electronic system according to one embodiment of the present invention.

FIG. 1 schematically depicts an electronic system 1 according to one embodiment of the present invention. Referring to FIG. 1, the electronic system 1 comprises a device 11 and an optical touch device 12. In some embodiments, the device 11 can be a portable electronic product such as, but not limited to, a mobile phone, a personal digital assistant, and a tablet computer. In some embodiments, the device 11 comprises a screen 111, and the optical touch device 12 is configured to detect or monitor activity of an object 13 on the screen 111. Specifically, the optical touch device 12 can detect the position of the object 13 on the screen 111 and send out the coordinate data of the position to device 11. In the detectable area of the optical touch device 12, at least one input region 112 can be arranged. The size, position, or other characteristics of the at least one input region 112 can be configured by users. The screen 111 displays a virtual input element 113 on the at least one input region 112. The virtual input element 113 allows users to know the location of where they can perform input operations on the screen 111 or the virtual input element 113 provides guidance to users to perform input operations. The virtual input element 113 can be similar to a physical input device. When the object 13 performs operations in the input region 112, the optical touch device 12 may generate data, wherein the data belongs to a type of data different from the type of data, to which the data, generated when the object 13 performs operations in a region 114 outside the input region 112, belongs. In some embodiments, when the object 13 performs operations in the region 114 outside the region 112, coordinate data of touch points are generated; when the object 13 touches the screen 111 in the input region 112, no coordinate data is generated.

In some embodiments, coordinate data and non-coordinate data may belong to different types of data. In some embodiments, vector data and coordinate data can belong to different types of data. In some embodiments, gesture event information and coordinate data can belong to different types of data.

In some embodiments, the virtual input element 113 is a virtual keyboard as shown in FIG. 1. A user can map out the position of a virtual keyboard in the detectable area of the optical touch device 12. Afterward, the screen 111 will display the virtual keyboard, and the optical touch device 12 will performing a mapping between the virtual keyboard and the input region 112. The user can input characters with the guidance of the virtual keyboard. Every time the object 13 touches a virtual key, the optical touch device 12 will determine the coordinate data of the touch point, determine a corresponding virtual key, and output a key code corresponding to the virtual key to the device 11. The device 11 will then display a corresponding character on the screen 111. In some embodiments, the key code may comprise a scan code. The key code can be transmitted to a physical interface of the device 11, which can translate the key code into an ASCII equivalent. In some embodiments, the optical touch device 12 can translate the key code into the ASCII equivalent, send the ASCII equivalent to the device 11, and display the corresponding character. The optical touch device 12 directly outputting ASCII equivalents can reduce the computational burden of the device for character input.

The optical touch device 12 allows users to map out the input region 112 by their own choices. Namely, users can configure an input region 112 of any size at any location in the detectable area of the optical touch device 12. In some embodiments, users can move the object 13 to surround a region, which is then used as an input region 112, in the detectable area of the optical touch device 12. In some embodiments, users can provide two opposite corner points of an input region 112 to define the input region 112 in the detectable area of the optical touch device 12. The present invention is not limited to the above-mentioned embodiments; other suitable methods for configuring an input region 112 are also applicable.

The optical touch device 12 allows users to configure multiple different regions for different types of input methods to meet the requirements of the users.

In some embodiments; the object 13 may comprise a stylus, a finger, or the like that is suitable for a touching operation.

Figure 2:
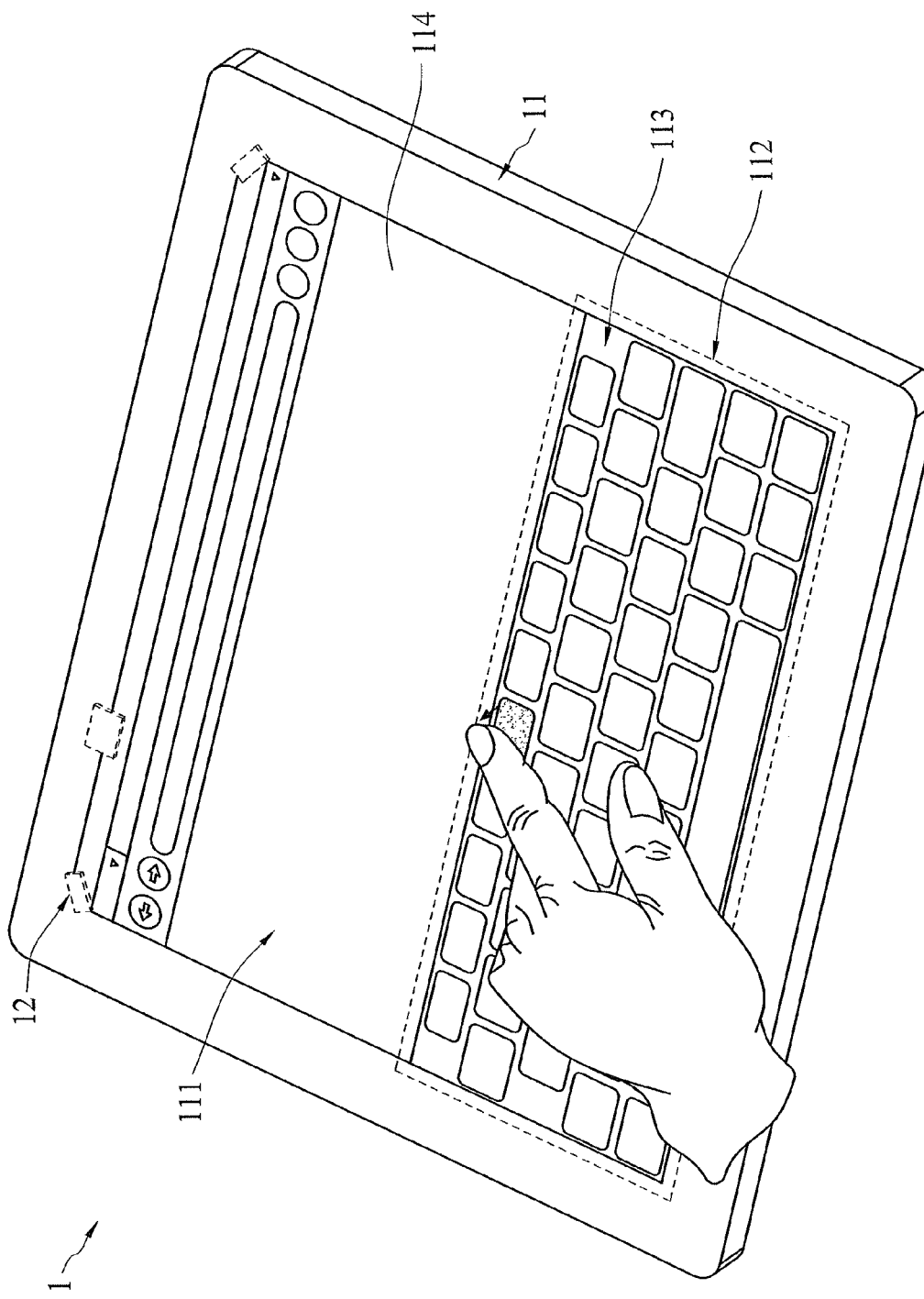
FIG. 2 schematically depicts an object performing an operation on an electronic system according to one embodiment of the present invention.

In some embodiments, when the object 13 touches a virtual key, the optical touch device 12 sends out a key code. In some embodiments, when the object 13 touches a virtual key, the virtual key will change such that the users can know that the virtual key has been selected. In some embodiments, when the object 13 contacts the screen 111 for selecting a virtual key, the optical touch device 12 does not instantly send out a key code, and the key code corresponding to the selected virtual key is sent out by the optical touch device 12 after the object 13 moves away from the screen 111, as shown in FIG. 2.

In some embodiments, when a plurality of objects 13 are in contact with the virtual keyboard, the optical touch device 12 stops sending out key codes to avoid improper input that may lead to an incorrect result generated by the device 11.

Figure 3:
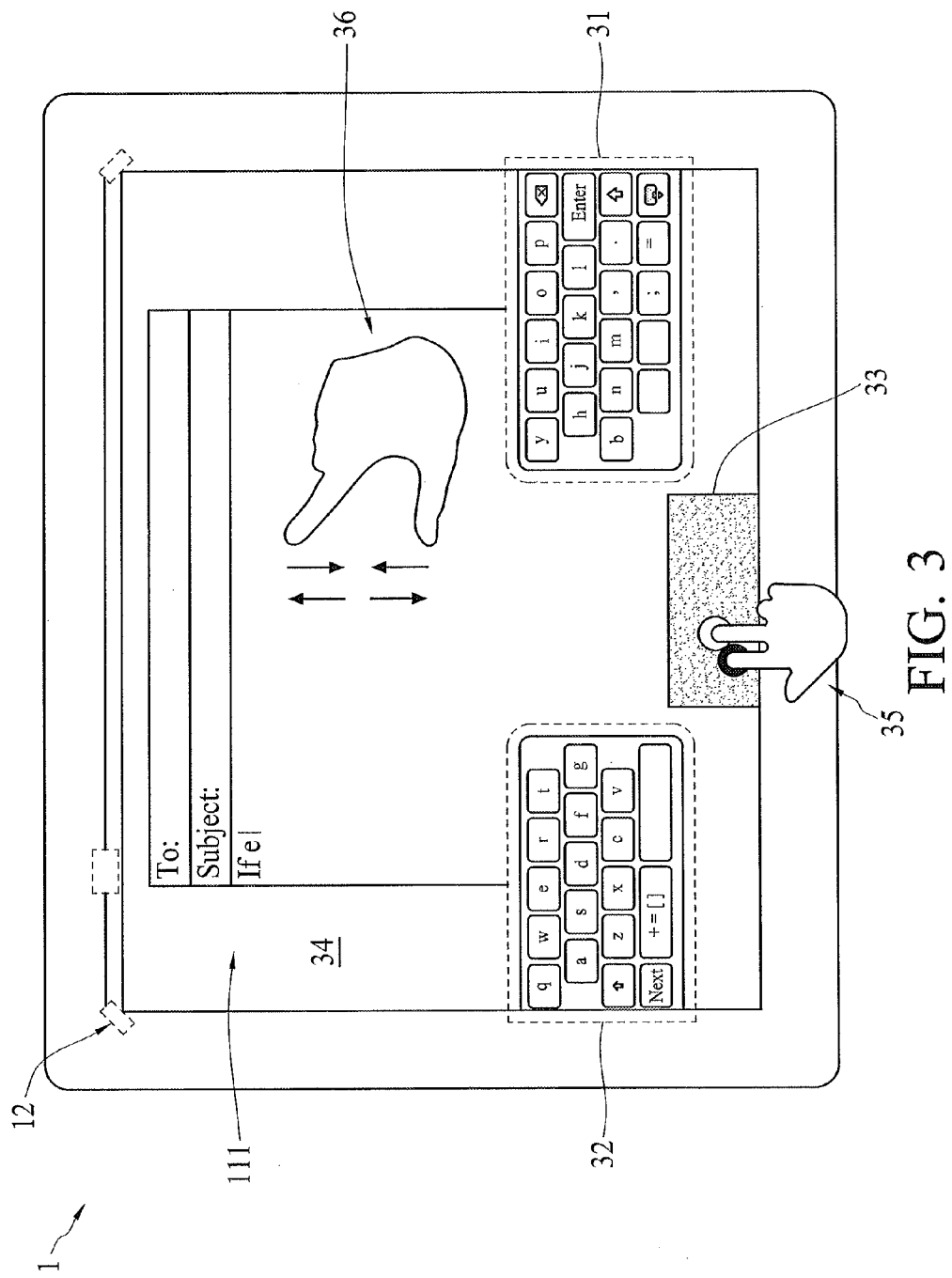
FIG. 3 schematically depicts an electronic system with a plurality of input regions according to one embodiment of the present invention.

FIG. 3 schematically depicts an electronic system 1 with a plurality of input regions according to one embodiment of the present invention. Referring to FIG. 3, users can freely define two sub-regions 31 and 32 in the detectable area of the optical touch device 12, and the screen 111 displays portions of a virtual keyboard on the plurality of input regions 31 and 32, respectively. With the guidance of the virtual keyboard, users can input characters using the two sub-regions 31 and 32 to insert characters into displayed documents. In addition, users can define another input region 33 adjacent to the virtual keyboard, wherein the input region 33 corresponds to an input method different from that corresponding to the two sub-regions 31 and 32. In some embodiments, the input region 33 is configured for gesture input, and in some embodiments, applicable gestures can be determined by users. In some embodiments, a region 34 other than the sub-regions 31 and 32 and the input region 33 is configured for gestures different from those performed in the region 33. In some embodiments, different regions, for example the input region 33 and the region 34, are configured to generate different gesture events when the same gesture is performed on the different regions. In some embodiments, the optical touch device 12 is configured to determine whether a gesture is performed on the input region 33 or the region 34 using a starting position of the gesture or a plurality of positions of the gesture movement.

In some embodiments, when a gesture is performed on different regions, for example the input region 33 and the region 34, the optical touch device is configured to execute a function related to one of the regions, on which the gesture lasts longer in distance or time.

In some embodiments, users can perform the press-and-tap gesture 35 on the input region 33 to open a shortcut menu, and the press-and-tap gesture 35 cannot be performed on the region 34. In some embodiments, users can configure different gestures to be performed on different regions.

The optical touch device 12 can be configured such that the same gesture can be performed on a plurality of regions. Referring to FIG. 3, in some embodiments, the zoom in/out gesture 36 can be performed on the region 33 and the region

34. In some embodiments, the optical touch device 12 is configured such that at least one gesture can be performed on all regions.

The optical touch device 12 can be configured such that performing a gesture on different regions can generate different effects. Referring to FIG. 3, in some embodiments, the optical touch device 12 can be configured such that the scroll gesture is used to control the text cursor in an editing document within the region 33, while the scroll gesture is used to scroll an editing document within the region 34.

In some embodiments, the optical touch device 12 can be configured to operate functions that are allowed to do on a physical touch panel on the input region 33. For example, when a user moves a finger on the input region 33, the optical touch device 12 can output a relative displacement vector.

In some embodiments, users are allowed to define a region 33 of any size at any location in the detectable area of the optical touch device 12. In some embodiments, users can define a region as the region 33 by moving the object 35 to delineate the boundary of the region in the detectable area of the optical touch device 12. In some embodiments, users can provide the coordinate data of two opposite corner points of the region 33 to define the region 33 as a rectangular.

Referring to FIG. 3, in some embodiments, users may not define another region 33, but switch the sub-region 31 or the sub-region 32 into the region 33. In other words, users are allowed to change the sub-region 31 or the sub-region 32 for inputting characters into the region 33 functioning as a touch panel.

Figure 4:
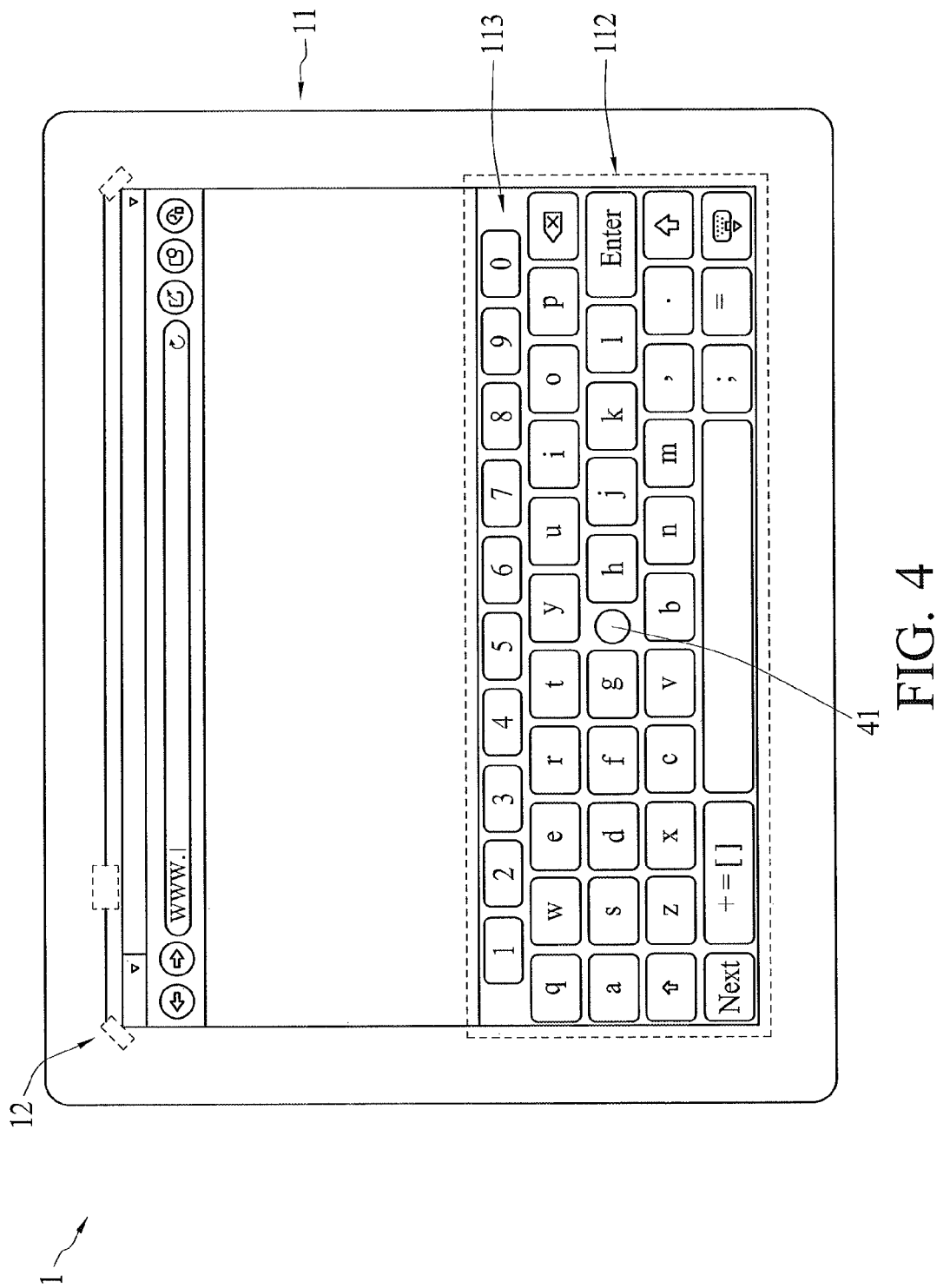
FIG. 4 schematically depicts an electronic system having an operation point and a plurality of input regions according to one embodiment of the present invention.
Figure 5:
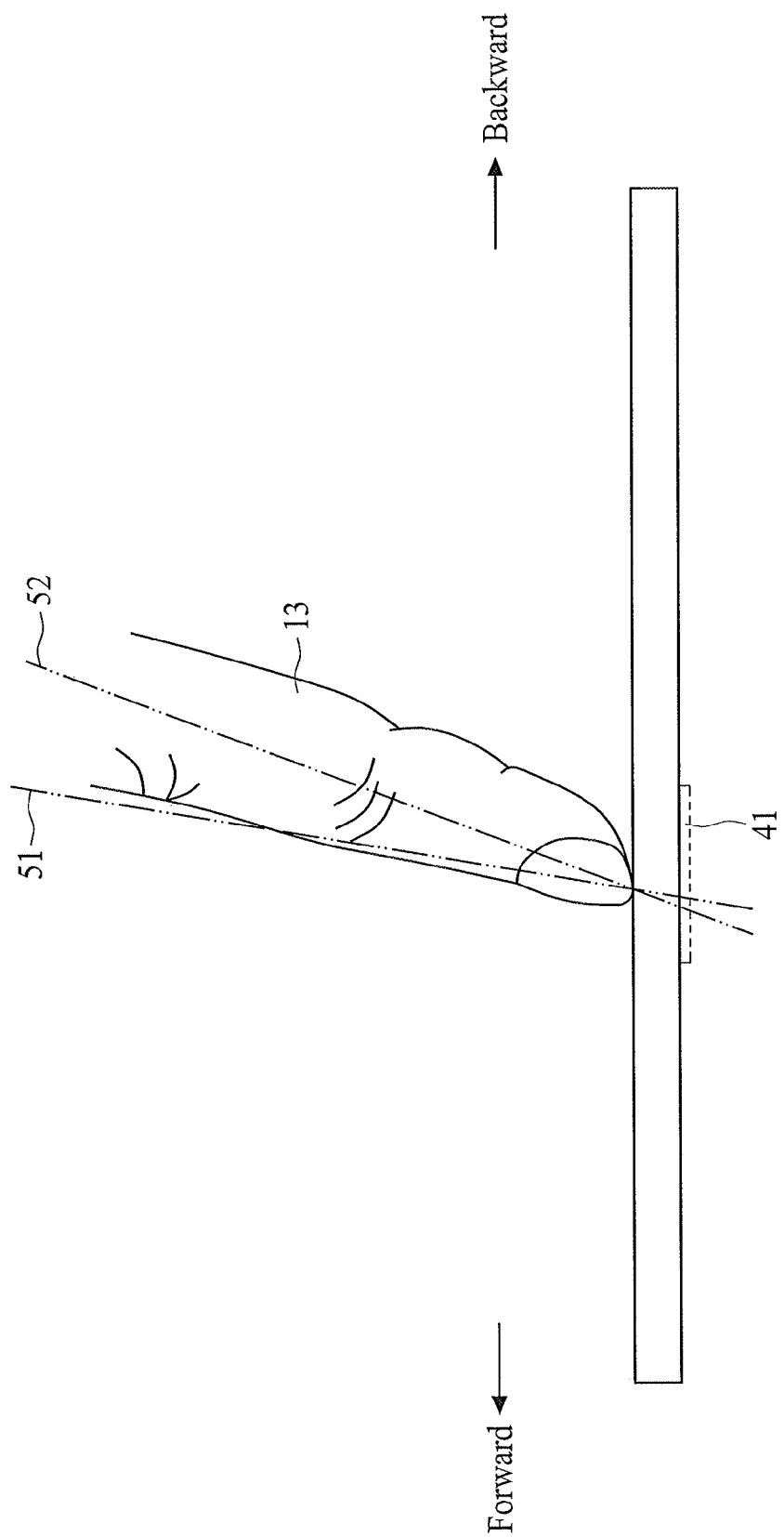
FIG. 5 schematically depicts an object performing a gesture on an operation point.

Referring to FIGS. 4 and 5, in addition to configuring the input region 112 for inputting characters, users may set up an operation point 41 in the detectable area of the optical touch device 12. In some embodiments, the operation point 41 is disposed outside the region 112 corresponding to the virtual keyboard. In some embodiments, the operation point 41 can be disposed in the region 112 corresponding to the virtual keyboard as shown in FIG. 4. As shown in FIG. 5, in some embodiments, the object 13 touches the operation point 41, defining an initial posture 51, and then tilts backward to a posture 52. During this moment, the optical touch device 12 detects that the object 13 is tilting backwards, and then generates a corresponding gesture event such as a backward scroll event or a backward movement event. Similarly, if the object 13 tilts right, the optical touch device 12 generates a right scroll event or a right movement event. In some embodiments, when the object 13 tilts from an initial posture to an inclined posture and remains on the operation point 41, the optical touch device 12 repeatedly outputs a same corresponding gesture event to the device 11.

Referring to FIG. 4, in some embodiments, when the object 13 is on the operation point 41, the optical touch device 12 will stop outputting the results generated from the operations performed in the input region 112 by the object 13. In some embodiments, when the object 13 touches the operation point 41, the optical touch device 12 may suspend the function (for example, a function of inputting characters) configured for the input region 112 and restores the original function (for example, a function of outputting coordinate data) that the optical touch device 12 provides. In some embodiments, when the object 13 is on the operation point 41, the optical touch device 12 may suspend the function of the virtual keyboard. At this moment, if the object 13 moves on the virtual keyboard, the optical touch device 12 does not output key codes but outputs object coordinate data or scroll events.

As shown in FIG. 4, in some embodiments, users can define an operation point 41 at any location in the detectable area of the optical touch device 12 and assign a shortcut function to the operation point 41. In some embodiments, when the operation point 41 is touched, simultaneous touches on the screens are simulated, and a plurality of functions are simultaneously performed. In some embodiments, when the operation point 41 is touched, simultaneous touches on a plurality of virtual keys are simulated.

Figure 6:
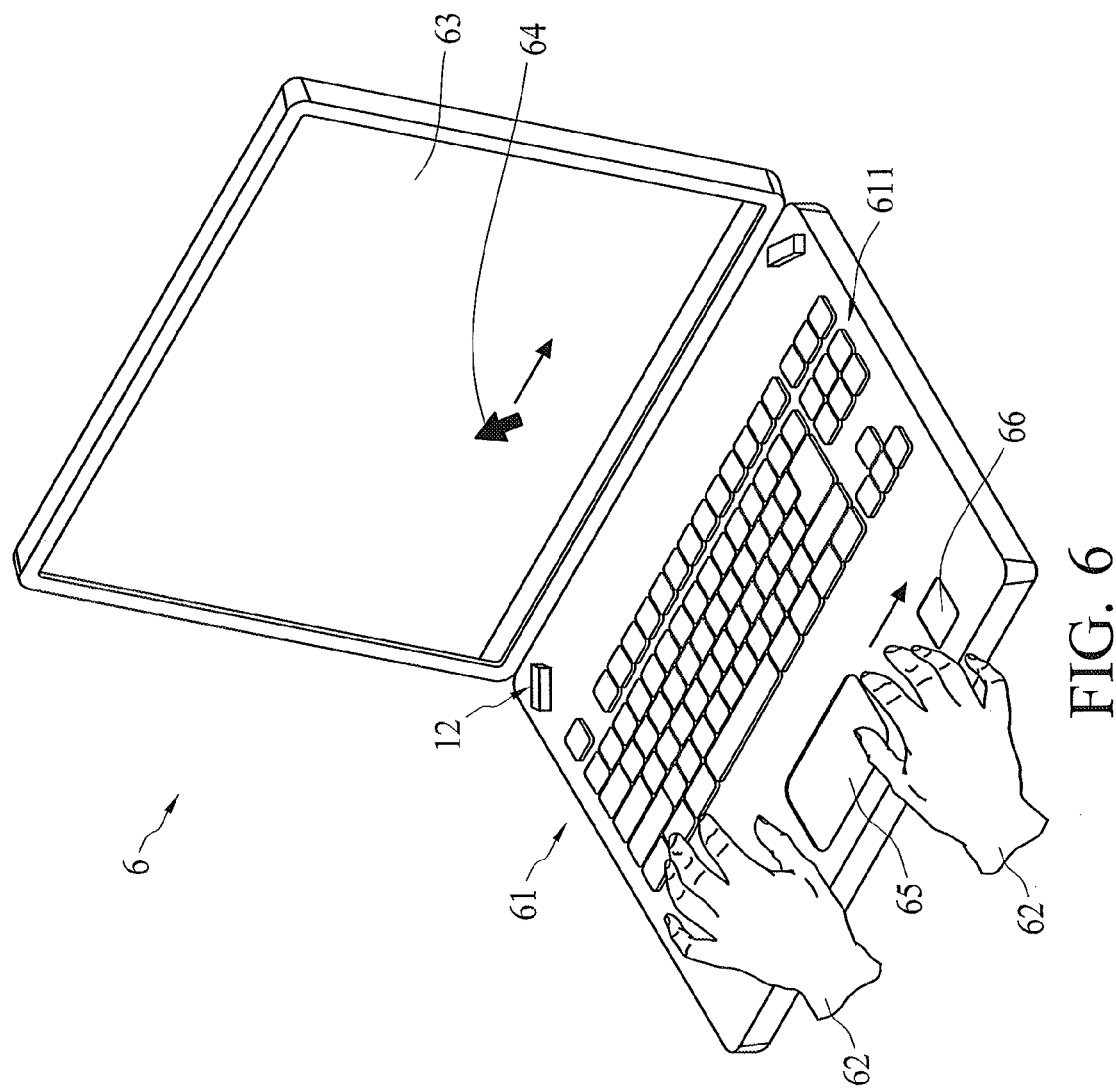
FIG. 6 schematically depicts an electronic system according to another embodiment of the present invention.

FIG. 6 schematically depicts an electronic system 6 according to another embodiment of the present invention. As shown in FIG. 6, the electronic system 6 comprises a device 61 and an optical touch device 12. The device 61 comprises a physical keyboard 611. The optical touch device 12 is configured to detect activity of an object 62 on the keyboard 611 to correspondingly output a gesture event.

In some embodiments, the device 61 comprises an electronic device with a physical keyboard, for example, a notebook. In some embodiments, the device 61 is a physical keyboard, by which users can input characters. In some embodiments, the device 61 comprises a mobile device with a physical keyboard.

In some embodiments, the device 61 comprises a screen 63. The screen 63 may display a pointing cursor 64, and the object 62 can move above the keyboard 611 to move the pointing cursor 64 on the screen 63. For example, when the object 62 moves left or right over the keyboard 611, the pointing cursor 64 moves left or right accordingly; when the object 62 moves toward the screen 63 or toward users, the pointing cursor 64 may move upward or downward accordingly. In some embodiments, when the object 62 moves, the optical touch device 12 determines a displacement vector ($\vec{x}, \vec{y}$) of the object 62 and outputs the vector ($\vec{x}, \vec{y}$) to the device 61. The device 61 then moves the pointing cursor 64 by the received vector ($\vec{x}, \vec{y}$). In some embodiments, the vector ($\vec{x}, \vec{y}$) can be transmitted using the standard protocol format such as PS2, ImPS/2 or IMPS/2. In some embodiments, the vector ($\vec{x}, \vec{y}$) can be transmitted using a user-defined format. Since users can perform gestures over keyboards to simulate computer mouse events, they do not need computer mice to perform input operations.

Furthermore, referring to FIG. 6, in some embodiments, the object 62 can move above the keyboard 611 to allow the optical touch device 12 to provide a scroll event to the device 61 for scrolling a window. In some embodiments, users can perform a pinch gesture above the keyboard 611 to shrink a window. In some embodiments, users can perform a spread gesture to magnify a window. The above-mentioned gestures are examples; other gestures not disclosed can also be performed above the keyboard 611.

In some embodiments, the keyboard 611 can be configured to have different regions, and the optical touch device 12 is configured to generate different gesture events when the same gesture is performed on the different regions. Furthermore, the optical touch device 12 can be configured to determine whether a gesture is performed on one region or another region of the keyboard 611 using a starting position of the gesture or a plurality of positions of the gesture movement.

Referring back to FIG. 6, the electronic system 6 comprises a touch pad 65, and the optical touch device 12 can detect the a gesture that the object 62 performs on the touch pad 65, generate a gesture event, and send the gesture event to the device 61. For example, users may use fingers perform a press-and-tap gesture on the touch pad 65, and after the optical touch device 12 detects that the fingers have performed a press-and-tap gesture, the optical touch device 12 sends a press-and-tap event to the device 61. In some embodiments, at least one gesture is allowed to be performed on the touch pad 65, but not allowed to be performed above the keyboard 611. For example, the optical touch device 12 is configured such that performing the press-and-tap gesture on the touch pad 65 can generate a gesture event, but performing the press-and-tap above the keyboard 611 cannot generate a gesture event. In some embodiments, at least one gesture can be performed on the touch pad 65 and above the keyboard 611. For example, the optical touch device 12 may be configured such that the pinch gesture and the spread gesture can be performed on the touch pad 65 and the keyboard 611.

Referring to FIG. 6 again, the electronic system 6 may further comprise an operation point 66, on which the object 62 can be placed for a gesture input operation. In some embodiments, as similarly shown in FIG. 5, when the object 62 is touching the operation point 66, the object 62 can tilt to allow the optical touch device 12 to generate a scroll event. In some embodiments, when the object 62 moves from one posture to another posture and continues touching the operation point 66, the optical touch device 12 repeatedly outputs a corresponding gesture event to the device 61. In some embodiments, the function of the optical touch device 12 performed on the operation point 66 is similar to that of the track point or a pointing stick of a general notebook.

Figure 7:
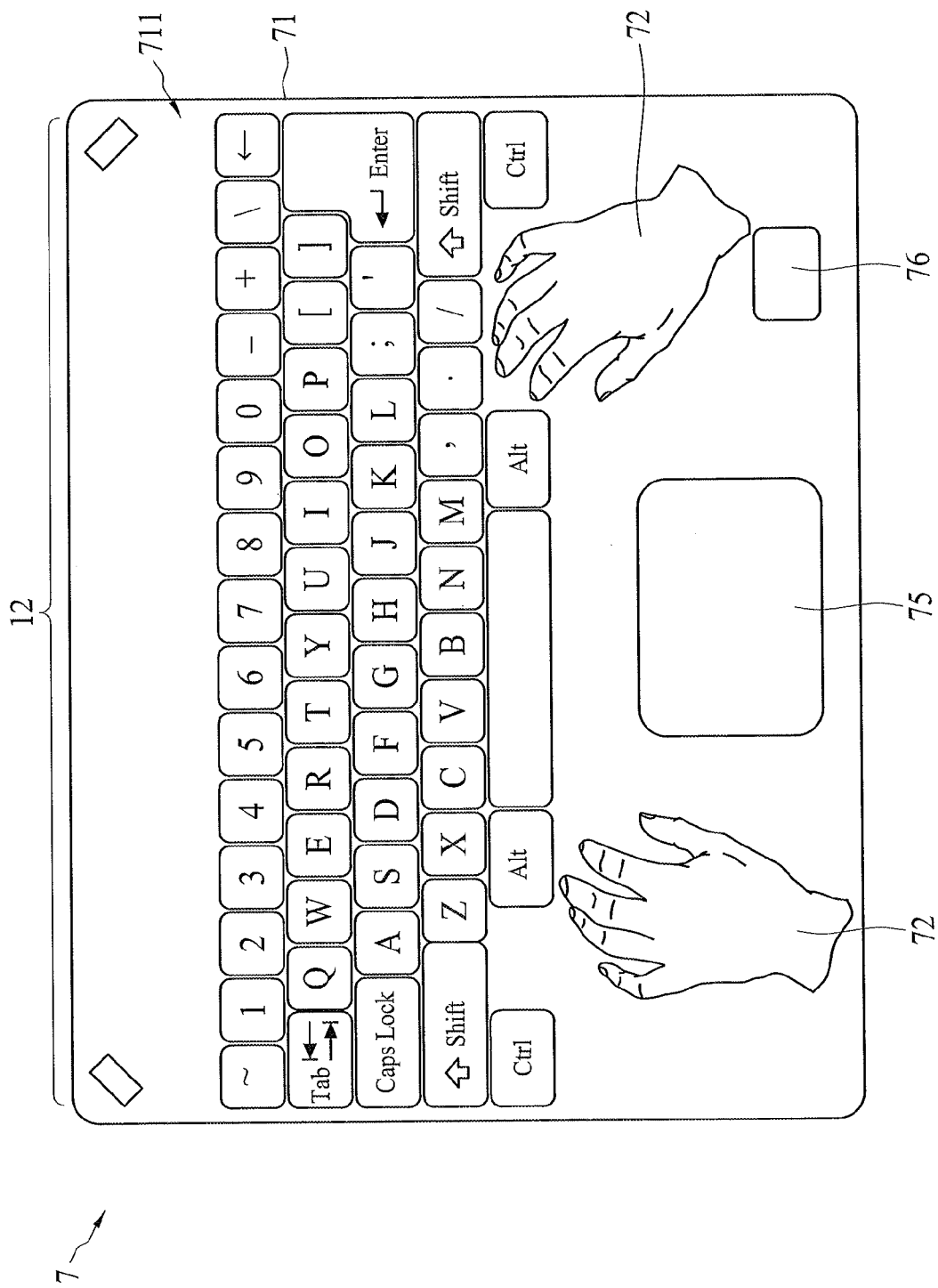
FIG. 7 schematically depicts an electronic system according to another embodiment of the present invention.

FIG. 7 schematically depicts an electronic system 7 according to another embodiment of the present invention. As shown in FIG. 7, the electronic system 7 comprises a platform 71 and an optical touch device 12. The platform 71 may comprise a key assembly 711. The optical touch device 12 can detect activity of an object 72 above the key assembly 711 to determine the key that the object 72 has pressed and then output the key code corresponding to the pressed key.

In some embodiments, the optical touch device 12 can store coordinate data corresponding to each key in advance. After determining coordinate data of the object 72, the optical touch device 12 can find out the corresponding key and send out the corresponding key code.

In some embodiments, the optical touch device 12 may analyze the up-and-down position change of a key between an image and a later-captured image, the change of the shape of a finger, or the up-and-down position change of the tip of a finger to determine the finger that has pressed a key, and then determine the corresponding key and output the corresponding key code.

In some embodiments, the optical touch device 12 may connect to an electronic device, which is connected with a screen showing a pointing cursor. The pointing cursor can be moved by moving the object 72 with the help of the optical touch device 12.

In some embodiments, the object 72 may perform gestures over the key assembly 711 to perform gesture operations. For example, the object 72 can move on the key assembly 711 to allow the optical touch device 12 to generate a scroll event.

In some embodiments, the key assembly 711 can be configured to have different regions, and the optical touch device 12 is configured to generate different gesture events when the same gesture is performed on the different regions. Furthermore, the optical touch device 12 can be configured to determine whether a gesture is performed on one region or another region of the key assembly 711 using a starting position of the gesture or a plurality of positions of the gesture movement.

In some embodiments, the platform 71 may not comprise a control circuitry for the key assembly 711; namely, without the control circuitry, no signal is generated when a key of the key assembly 711 is pressed. In some embodiments, the platform 71 may comprise a control circuitry to generate signals corresponding to the press of the key assembly 711.

As shown in FIG. 7, the platform 71 may comprise a touch pad region 75, and the optical touch device 12 is configured to detect activity of the object 72 on the touch pad region 75 for detecting the gestures performed by the object 72. For example, the finger of a user may perform a press-and-tap gesture on the touch pad region 75, and after the optical touch device 12 detects that the press-and-tap gesture is formed, the optical touch device 12 generates a press-and-tap event. In some embodiments, the optical touch device 12 is configured such that different gestures are performed on the key assembly 711 and the touch pad region 75. For example, the optical touch device 12 may be configured such that a press-and-tap gesture is applicable on the touch pad region 75, while the press-and-tap gesture cannot be performed on the key assembly 711. Furthermore, the optical touch device 12 may be configured such that a page flip gesture is applicable on the key assembly 711, while the page flip gesture cannot be performed on the touch pad region 75.

The platform 71 may comprise an operation point 76. The object 72 can touch the operation point 76 to perform a gesture input operation. In some embodiments, as similarly shown in FIG. 5, when the object 72 is touching the operation point 76, the object 72 can tilt to allow the optical touch device 12 to generate a scroll event. In some embodiments, when the object 72 moves from one posture to another posture and continues touching the operation point 76, the optical touch device 12 repeatedly outputs a corresponding gesture event.

Figure 8:
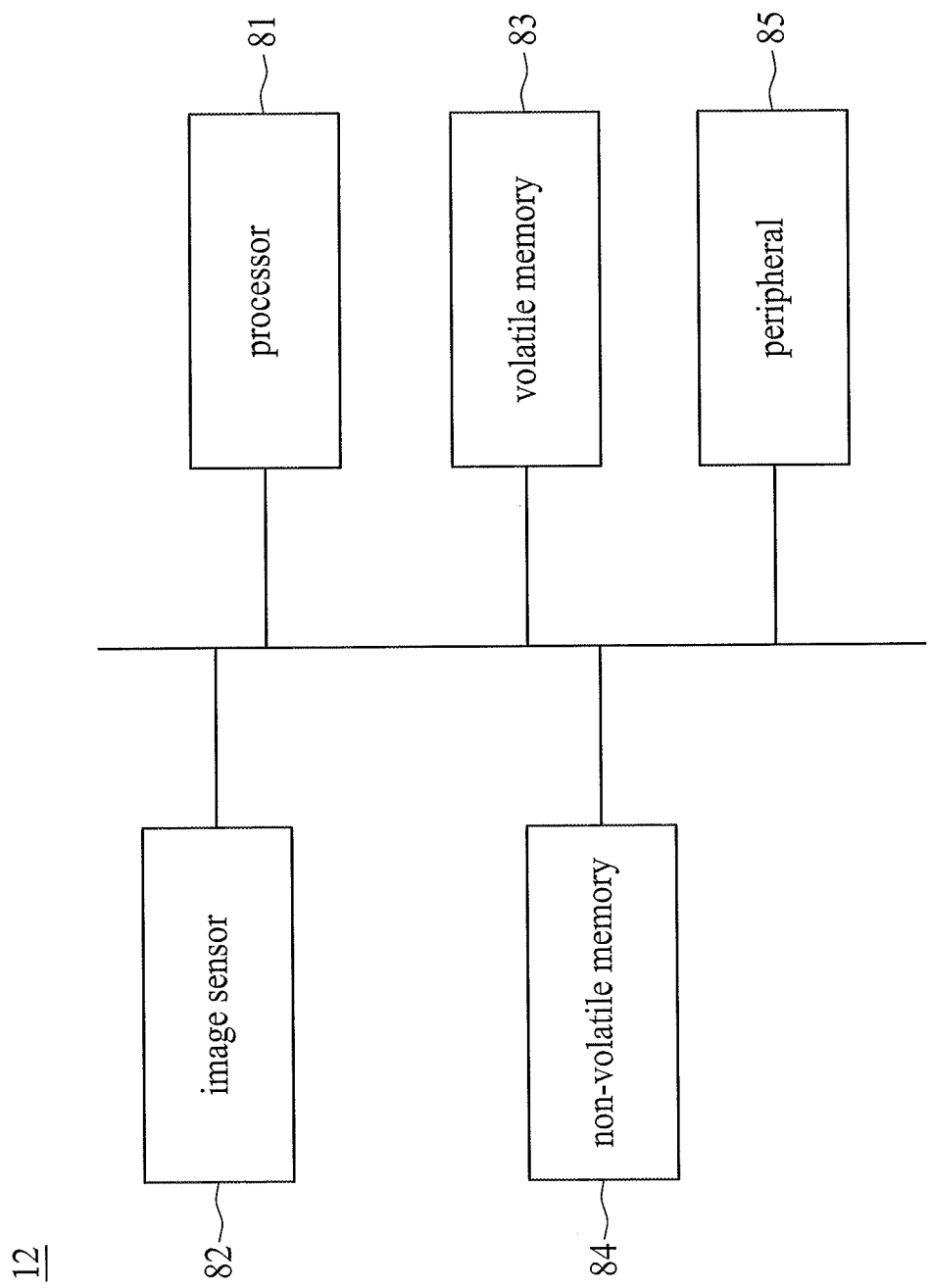
FIG. 8 is a block diagram related to an optical touch device according to one embodiment of the present invention.

FIG. 8 is a block diagram related to an optical touch device 12 according to one embodiment of the present invention. Referring to FIG. 8, the optical touch device 12 comprises a processor 81 coupled with an image sensor 82 configured to detect activity of an object on or over a keyboard, a touch pad or an operation point. The image sensor 82 can generate a plurality of pictures, at least one of the plurality of pictures comprising an object image. The processor 81 is configured to execute the processes required by the embodiments of the present invention. The processor 81 can analyze the coordinate data of the object, the displacement vectors of the object, or gestures using the images. In some embodiments, when a position for performing a specific function is arranged for the optical touch device 12 and the processor 81 determines that the object is on the position, the processor 81 performs that specific function. In some embodiments, the processor 81 can establish an input region according to the configuration from a user. In some embodiments, the processor 81 can perform a mapping between an input region and a virtual keyboard. In some embodiments, the processor 81 can determine a pressed key and the key code thereof according to coordinate data of the object. In some embodiments, the processor 81 can further translate a key code into an ASCII equivalent. In some embodiments, the processor 81 can change, according to the configuration from a user, the size of an input region, segment an input region, merge input regions or change the relative positions of two input regions. In some embodiments, the processor 81 is configured to allow a user to perform different gestures in two input regions according to the configuration from the user. In some embodiments, the processor 81 is configured to allow at least one gesture to be performed in multiple or all input regions according to a user's configuration. In some embodiments, the processor 81 is configured to determine the input region where the object is located according to the coordinate data of the object. In some embodiments, the processor 81 is configured to receive an instruction from a user to allow switching between different functions of an input region. For example, a character input function is switched to a gesture input function similar to the function used in a touch pad.

The optical touch device 12 may comprise a volatile memory 83 configured to store the programs and data required for the operations of the optical touch device 12. The optical touch device 12 may comprise a non-volatile memory 84, which is configured to permanently store the operating system of the optical touch device 12, required programs, user's configurations, and data. The optical touch device 12 may comprise a peripheral 85, which can be configured to communicate with an external device. The peripheral 85 may comprise a wired device or wireless device. The peripheral device may comprise a USB (Universal Serial Bus) port, PS/2 (Personal System/2) port or other connection ports.

A portion of optical touch devices of the present invention are disclosed below and the present invention is not limited to the disclosed optical touch devices.

Figure 9:
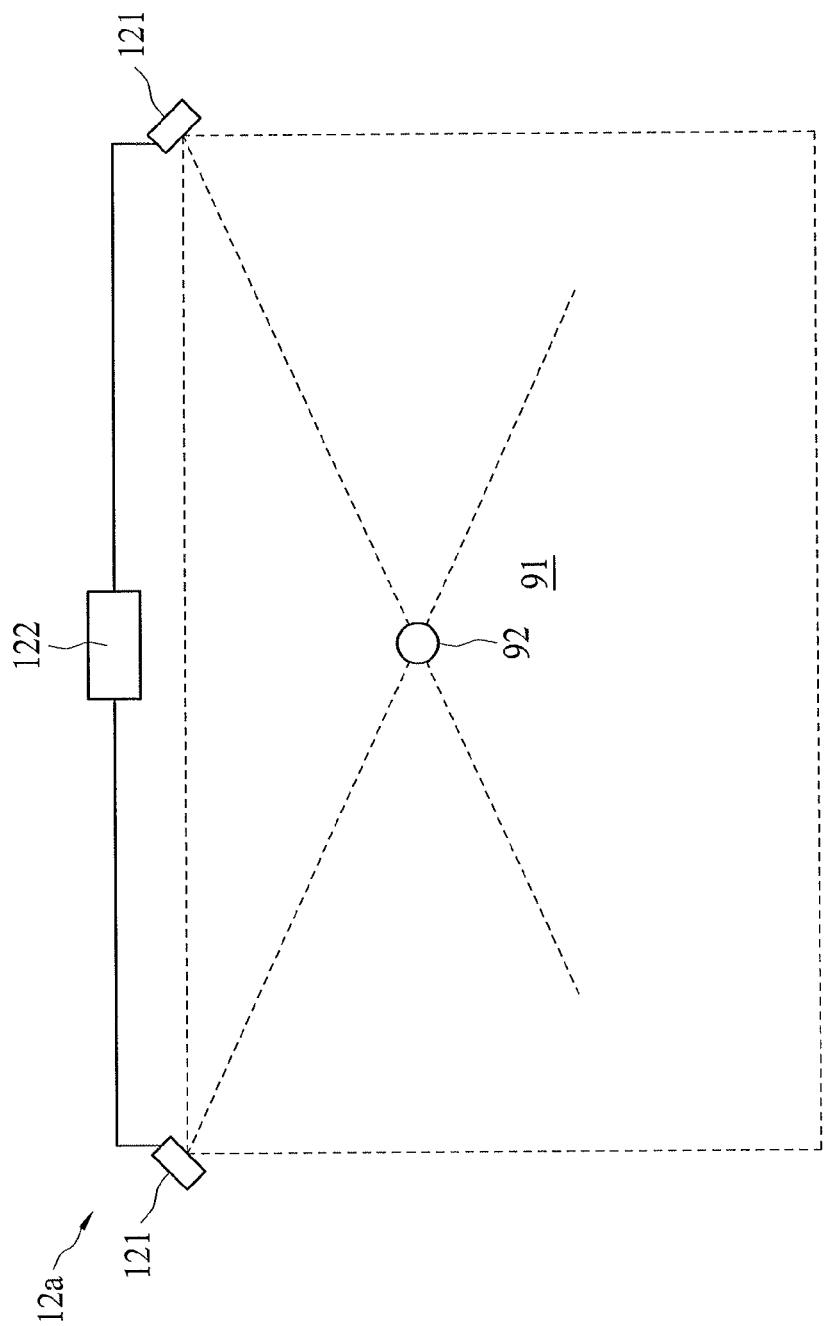
FIG. 9 schematically depicts an optical touch device according to one embodiment of the present invention.

FIG. 9 schematically depicts an optical touch device 12a according to one embodiment of the present invention. The optical touch device 12a comprises two image sensors 121 and a processor 122. The image sensors 121 can detect the activity of an object 92 in a detectable area 91. The processor 122 is coupled with the image sensors 121 for analyzing the pictures generated by the image sensors 121, thereby acquiring the coordinate data of the object 92, the displacement vector data of the object 92, or the gestures of the object 92. The method for calculating the coordinate data of an object refers to U.S. patent application Ser. No. 13/302,481, the disclosure of which is incorporated by reference herein.

Figure 10:
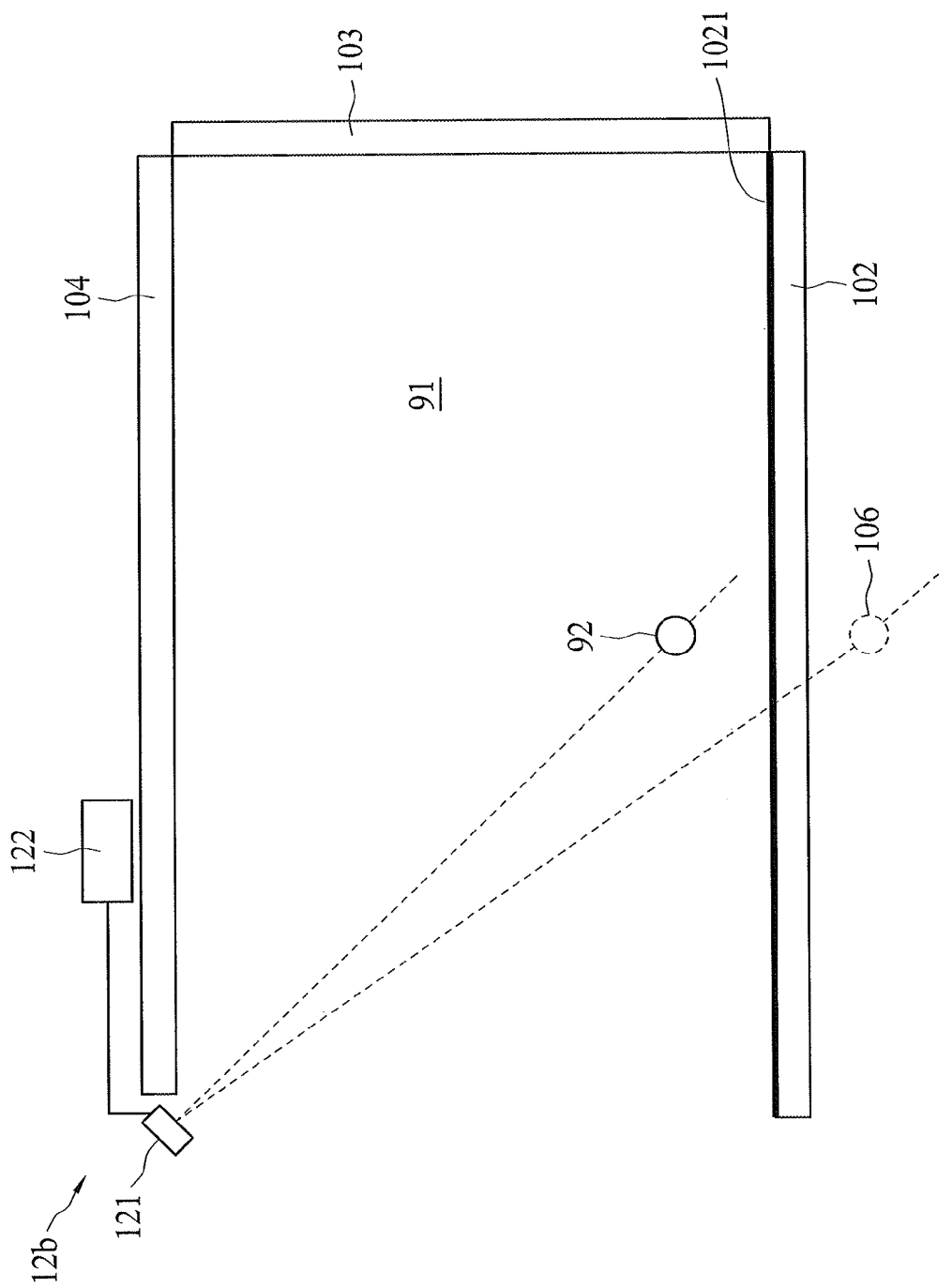
FIG. 10 schematically depicts an optical touch device according to another embodiment of the present invention.

FIG. 10 schematically depicts an optical touch device 12b according to another embodiment of the present invention. The optical touch device 12b comprises an image sensor 121, a processor 122, and a mirror element 102. The mirror element 102 comprises a mirror surface 1021, which can generate a reflection 106 of an object 92. The image sensor 121 can detect the object 92 in a detectable area 91 and the reflection 106 of the object 92. The processor 122 is coupled with the image sensor 121 for analyzing pictures from the image sensor 121. The processor 122 can use the images of the object 92 and the images of the reflection 106 to determine the coordinate data of the object 92, the object displacement vector data, or gestures. The method for determining coordinate data or gestures refers to U.S. Pat. No. 7,689,381 B2, U.S. patent application Ser. No. 13/302,481, and U.S. patent application Ser. No. 13/606,942, the disclosures of which are incorporated by reference herein. In addition, the optical touch device 12b can further comprise at least one light-projecting element 103 or 104, which is configured to provide light for the detectable area 91, wherein the light-projecting element 103 or 104 can be a light source or a light guide.

Figure 11:
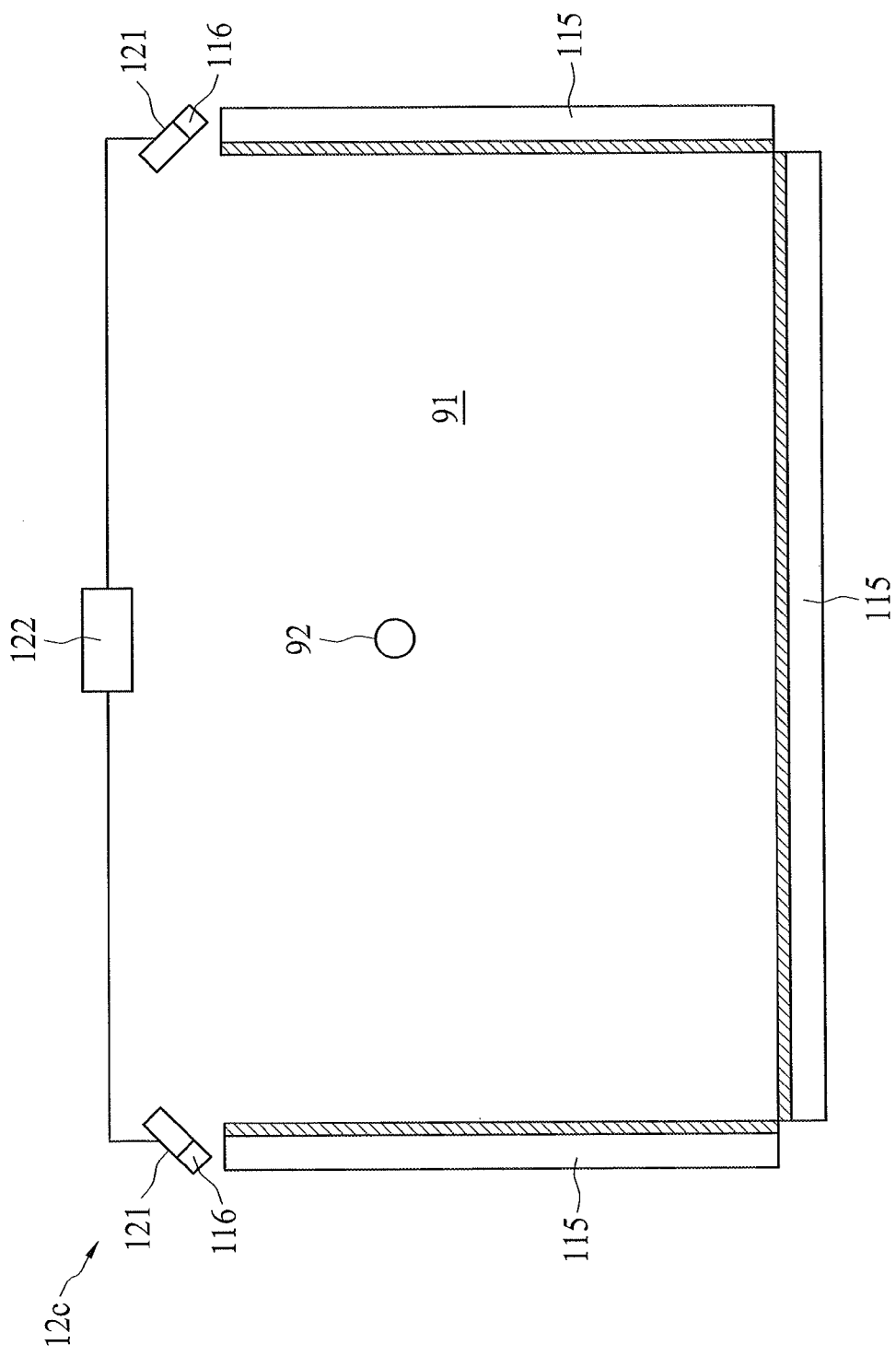
FIG. 11 schematically depicts an optical touch device according to another embodiment of the present invention.

FIG. 11 schematically depicts an optical touch device 12c according to another embodiment of the present invention. The optical touch device 12c comprises two image sensors 121, a processor 122, a plurality of retro-reflectors 115, and two light sources 116. The two image sensors 121 can detect the activity of an object 92 in a detectable area 91. The light sources 116 provide light for the detectable area 91. The retro-reflectors 115 are disposed at the periphery of the detectable area 91 to reflect light from the light sources 116. The processor 122 is coupled with the image sensors 121 to analyze pictures from the image sensor 121 to determine the coordinate data of the object 92, the object displacement vector data, or gestures. In some embodiments, the light source 116 comprises a light-emitting diode.

Figure 12:
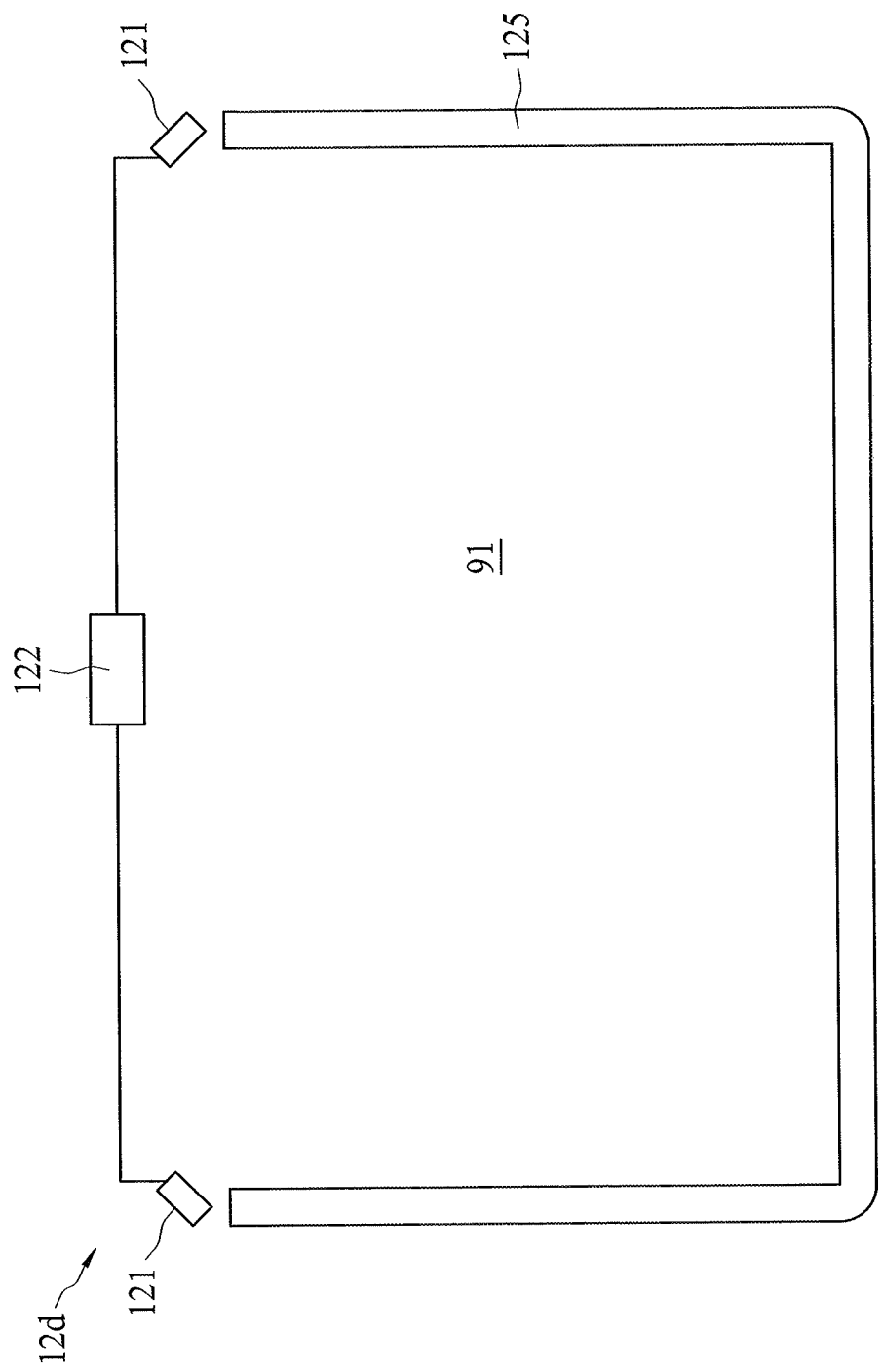
FIG. 12 schematically depicts an optical touch device according to another embodiment of the present invention.

FIG. 12 schematically depicts an optical touch device 12d according to another embodiment of the present invention. The optical touch device 12d comprises two image sensors 121, a processor 122, and a light guide element 125. The two image sensors can detect the activity of an object 92 in a detectable area 91. The processor 122 is coupled with the image sensors 121 and can analyze pictures from the image sensor 121 to determine the coordinate data of the object 92, the object displacement vector data, or gestures. The light guide element 125 extends at least a portion of the periphery of the detectable area for guiding light and projecting light to the detectable area 91

Figure 13:
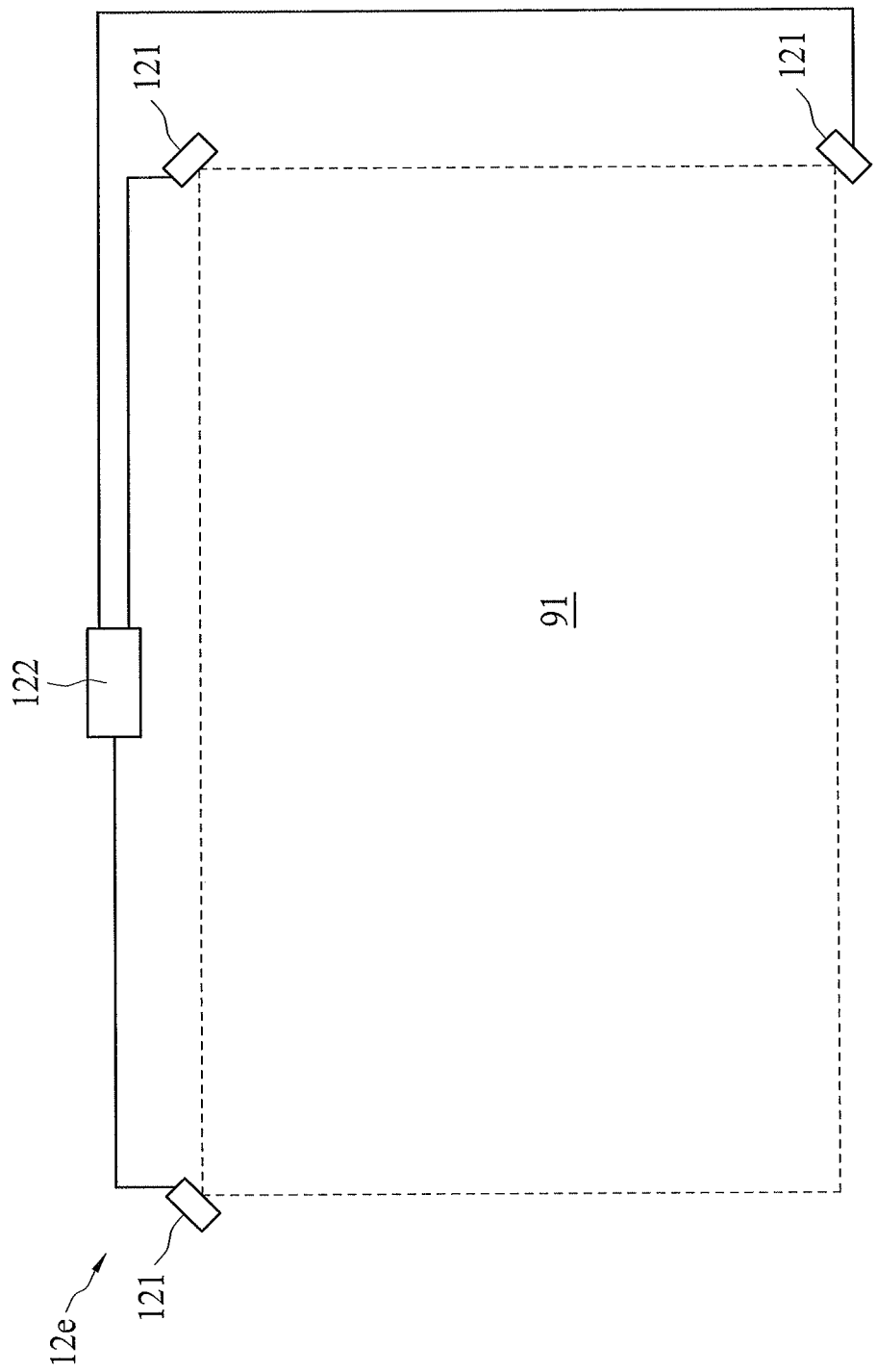
FIGS. 13 and 14 are views showing optical touch devices according to another embodiment of the present invention.
Figure 14:
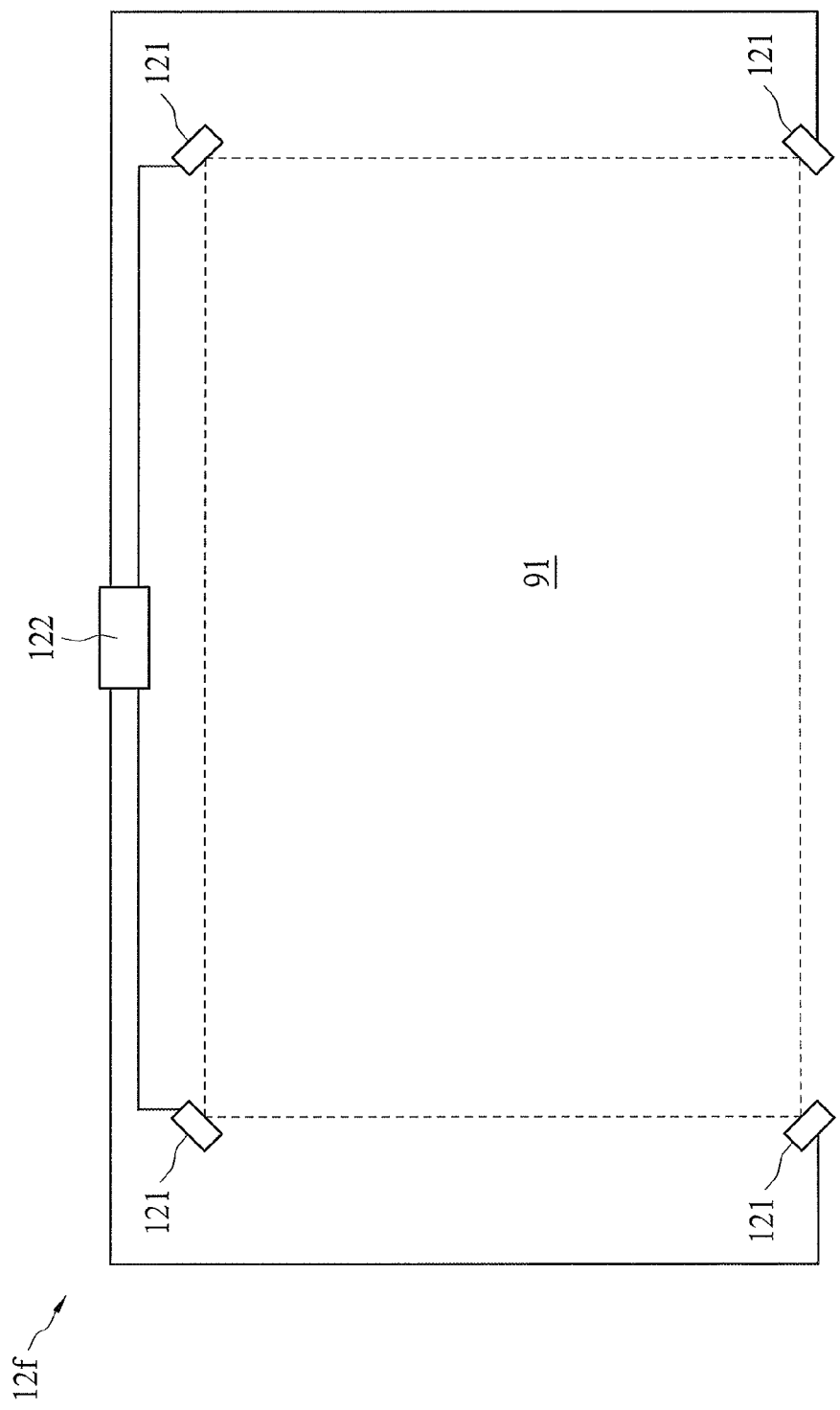

FIGS. 13 and 14 are views showing optical touch devices 12e and 12f, respectively, according to another embodiment of the present invention. The optical touch device 12e or 12f comprises three or more image sensors 121, which are disposed at corresponding corners of a detectable area 91. The image sensor 121 is coupled with a processor 122, which can analyze pictures from the image sensors 121 to determine the coordinate data of the object 92, the object displacement vector data, or gestures.

Figure 15:
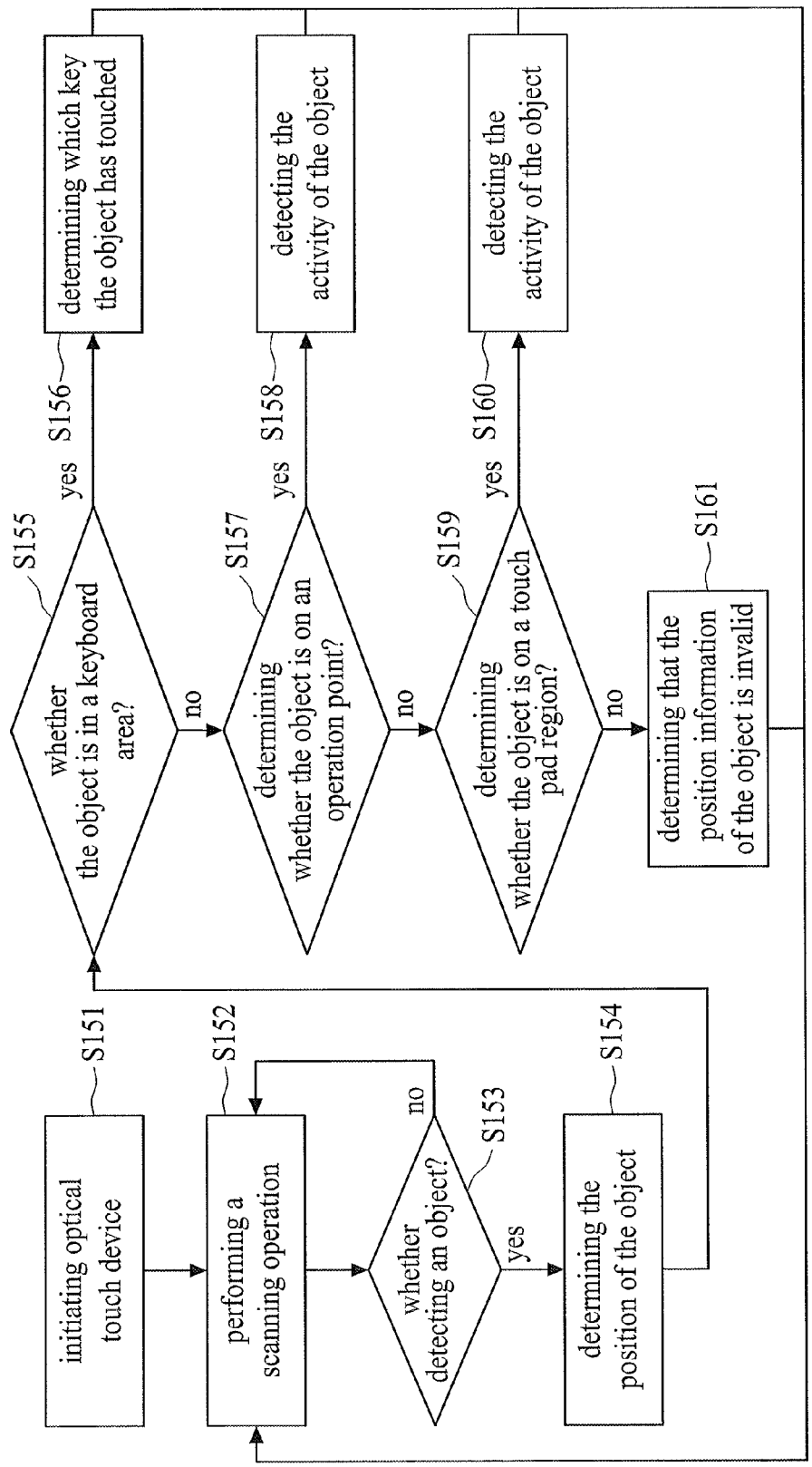
FIG. 15 is a flow diagram showing the steps of a method for an optical touch device according to one embodiment of the present invention.

FIG. 15 is a flow diagram showing the steps of a method for an optical touch device according to one embodiment of the present invention. Referring to FIG. 15, in Step S151, an optical touch device is initiated after it is activated. In Steps S152 and S153, the optical touch device starts to perform a scanning operation. When no object is found in a detectable area, the optical touch device continues to scan. In Step S154, when the optical touch device detects an object, the optical touch device determines the position of the object. In Step S155, the optical touch device determines whether the object is in a keyboard area. If so, the method proceeds to Step S156; if not, the method proceeds to Step S157. In Step S156, the optical touch device determines which key the object has touched and generates a corresponding key code. In Step S157, the optical touch device determines whether the object is on an operation point. If so, the method proceeds to Step S158; if not, the method proceeds to Step S159. In Step S158, the optical touch device detects the activity of the object on the operation point and generates a corresponding event. In Step S159, the optical touch device determines whether the object is on a touch pad region. If so, the method proceeds to Step S160; if not, the method proceeds to Step S161. In Step S160, the optical touch device detects the activity of the object on the touch pad region and generates a corresponding event. In Step S161, if the object is not in the keyboard area, on the operation point and on the touch pad region, the optical touch device determines that the position information of the object is invalid. Under such a circumstance, the optical touch device may report a message or neglect detecting results, and the method proceeds back to Step S152.

In some embodiments, an optical touch device is configured to have the functions of a plurality of input devices. The optical touch device allows users to perform several gestures on a region, which leads to an increase in convenience. In addition, if electronic devices adopt the optical touch device, the design of their hardware and software can be simplified and their cost can be reduced. The input region of the optical touch device can be flexibly defined and is not limited by an existent hardware configuration. The output data can also be flexibly defined. The format of data can follow existing standards or be defined by users.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

It will be apparent to those skilled in the art that various modifications can be made to the disclosed embodiments. It is intended that the specification and examples be considered as exemplary only, with the true scope of the disclosure being indicated by the following claims and their equivalents.

What is claimed is:

1. An electronic system comprising:
   a device comprising a unitary screen integrated into the device, the screen having defined thereon a plurality of regions; and
   an optical touch device configured to detect activity of an object touching the screen, the optical touch device being configured to generate first data when the object performs a gesture touching and moving along a surface of a first region of the screen and to generate second data when the object performs a gesture touching and moving along a surface of at least a second region of the screen, wherein
   the first data and the second data are of different data types,
   the first region is separate from the second region,
   the optical touch device is configured to generate a first gesture event in response to the gesture being performed touching and moving along the surface of the first region that is different from a second gesture event generated in response to the same gesture being performed touching and moving along the surface of the second region, and
   the optical touch device is further configured to generate at least one of a track point and a pointing stick event in response to the object touching a predetermined operation m point defined in one of the first and second regions, the at least one of a track point and a pointing stick event being determined based on a posture of the object while touching the predetermined operation point.

2. The electronic system of claim 1, wherein the screen displays a virtual keyboard on the first region of the screen, and the first data comprises a key code.

3. The electronic system of claim 2, wherein the optical touch device is configured to stop generating data when a plurality of objects are on the first area.

4. The electronic system of claim 1, wherein the first data comprises a displacement vector.

5. The electronic system of claim 1, wherein the second data comprises coordinate data.

6. The electronic system of claim 1, wherein the optical touch device is configured to generate the first data when the object moves away from the first region of the screen.

7. The electronic system of claim 1, wherein the optical touch device is configured to provide different types of input mechanisms that are receivable via the second region.

8. The electronic system of claim 7, wherein the screen displays a virtual keyboard on the first region, and the second region is configured for gesture input.

9. The electronic system of claim 7, wherein the first and second regions are respectively configured for different types of gesture input.

10. The electronic system of claim 7, wherein the first and second regions are user-configurable.

11. The electronic system of claim 1, wherein when a gesture is performed on the first region and the second region, the optical touch device is configured to execute a function related to one of the first and second regions, on which the gesture lasts longer or from which the gesture starts.

12. The electronic system of claim 1, wherein the first region comprises an operation point, wherein the optical touch device is configured to stop generating the first data when the object is on the operation point.

13. The electronic system of claim 1, wherein the screen displays an operation point, wherein the optical touch device is configured to generate a gesture event when the object tilts on the operation point.

14. The electronic system of claim 1, wherein the screen displays an operation point having a shortcut function.

15. The electronic system of claim 1, wherein the optical touch device is configured to allow the first region to correspond to different switchable input functions.

16. An electronic system comprising:
   a device comprising a unitary screen integrated into the device, the screen having defined thereon a plurality of regions; and
   an optical touch device configured to detect activity of an object touching the screen, the optical touch device being configured to generate first data when the object performs a gesture touching and moving along a surface of a first region of the screen and to generate second data when the object performs a gesture touching and moving along a surface of at least a second region of the screen, wherein
   the first data and the second data are of different data types,
   the first region is separate from the second region, and
   the optical touch device is further configured to generate at least one of a track point and a pointing stick event in response to the object touching a predetermined operation point defined in one of the first and second regions, the at least one of a track point and a pointing stick event being determined based on a posture of the object while touching the predetermined operation point.

* * * * *